TRANSMISSION FOR MAGNETIC SOUND RECORDING MACHINES

Filed April 1, 1957 2 Sheets-Sheet 1

INVENTOR.
Ralph A. Schuyler
BY
R. A. Kaucher

June 17, 1958 R. A. SCHUYLER 2,838,959

TRANSMISSION FOR MAGNETIC SOUND RECORDING MACHINES

Filed April 1, 1957 2 Sheets-Sheet 2

INVENTOR.
Ralph A. Schuyler

BY K. A. Hauchen 2,838,959

TRANSMISSION FOR MAGNETIC SOUND RECORDING MACHINES

Ralph A. Schuyler, Los Altos, Calif., assignor to Monte Verde Industries, Redwood City, Calif., a corporation of California Application April 1, 1957, Serial No. 649,871

6 Claims. (Cl. 74—721)

The present invention relates to magnetic sound recording machines of the type employing a magnetizable tape or wire as the recording medium. In machines of this type the magnetizable tape or wire is taken from a supply reel, conducted past the recording head of the machine and wound upon a takeup reel which is the drive reel of the machine during the recording operation. Whenever information or music recorded upon a recording medium of the type referred to is to be played back, or whenever it is necessary to correct previously recorded information, the tape or wire must be wound back upon the supply reel, in which case said latter reel must function as the drive reel while the take-up reel acts as an idler.

It is an object of my invention to provide a simple and inexpensive transmission by means which the supply and take-up reels of a magnetic recording machine, of the type here under consideration, may selectively be operated as the drive reel from a single, uni-directionally operating motor.

When recording music or information upon recording machines, of the type referred to, the tape or wire is usually conducted past the recording head at a relatively slow speed to make clear recordings and to make the most of a given length of tape or wire. On the other hand, when the tape or wire is to be rewound upon the supply reel, be it for the purpose of play-back or correction, it is desirable that the rewinding operation proceed with the highest permissible speed, and in any case with a speed many times greater than the recording speed, to reduce to the lowest possible limit the period of time during which an operator must wait before he may commence correcting, or playing back, previously recorded information.

It is another object of my invention to provide a simple and inexpensive transmission by means of which the supply reel and the take-up reel of a magnetic sound recording machine may selectively be driven in opposite directions at materially different speeds.

It is yet another object of my invention to provide an adjustable transmission, of the type referred to, that requires but a single movable component to effect the change-over from low speed operation of one reel in one direction to high speed operation of the other reel in the opposite direction.

An additional object of my invention is to provide an adjustable transmission, of the type referred to, that is of compact construction and requires a minimum of space and which is yet dependable in operation.

These and other objects of my invention will be apparent from the following description of the accompanying drawings which illustrate a preferred embodiment thereof and wherein.

Figure 1:
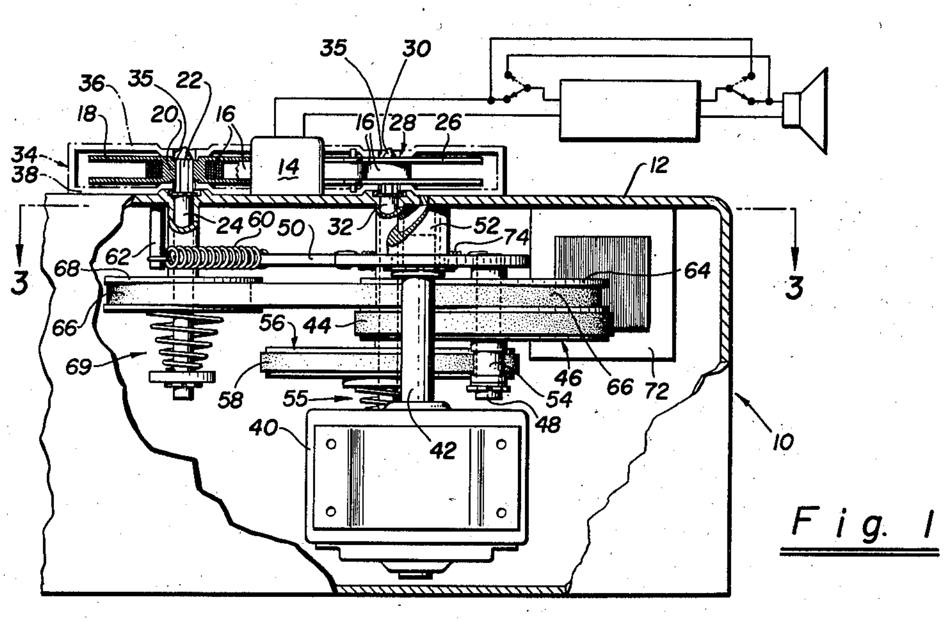
Figure 1 is a fragmentary front elevation of a magnetic sound recording machine provided with a transmission embodying my invention.

Having first reference to Figure 1, the magnetic sound recording machine shown therein comprises a casing 10 which may be of aluminum and which has a top panel 12 upon which is mounted the recording and play-back head 14. The exemplary recording machine illustrated in the accompanying drawing is of the type employing a magnetizable tape 16 as recording medium. Said tape is wound upon a supply reel 18 that has a tubular hub 20 of polyonal cross-section and which is engaged over the correspondingly shaped upper end 22 of a vertical shaft 24 that is disposed within the casing 10 and projects through and above the panel 12 thereof. The free end of tape 16 is anchored in a take-up reel 26 which has also a tubular hub 28 of polyonal cross-section, and said hub is engaged over the correspondingly shaped upper end 30 of another vertical shaft 32 that is disposed within the casing 10 and projects through and above the top panel 12 thereof. When the machine is used for recording, the shaft 32 drives the take-up reel 26, while shaft 24 is allowed to idle, drawing tape from the supply reel 18, guiding it past the recording head 14 for magnetization, and winding the magnetized tape upon the take-up reel 26. When the magnetized tape is to be readied for play-back, however, the shaft 24 is employed as the drive shaft to turn the reel 18 in a direction opposite to the one in which it was turned during the recording operation and at a substantially greater speed. This draws the tape from the take-up reel 26 which idles during this phase in the operation of the machine, and winds it back upon the supply reel 18.

For the sake of convenience in replacing the reels for new recordings, the reels 18 and 26 with the tape wound upon and extending between them, may be arranged to form an independent magazine unit by mounting them in their proper positions within a flat casing as indicated at 34 in phantom lines in Figure 1. Said casing has aligned apertures 35 in its top and bottom walls 36 and 38 corresponding to the tubular hubs 20 and 28 of the reels enclosed therein, so that the casing may readily be mounted upon the projecting ends 22 and 30 of the shafts 24 and 32 respectively, with the reels 18 and 26 in operative engagement therewith.

To selectively operate the shafts 24 and 32 in the described manner from a single uni-directional motor 40 shown as supported from a side wall of the casing 10, and with a minimum of settable components to effect the change-over from one operation to the other, I provide the transmission of my invention. So as to drive the take-up reel 26 in such a manner that the tape 16 is pulled from the supply reel 18, is guided past the recording head 14 at an appropriately slow speed and is wound up upon the take-up reel, the upwardly directed output shaft 42 of the motor 40 is held in engagement with a rubber tire 44 that is received within the peripheral edge of a wheel 46 which is made of a heavy material such as steel, and is of a relatively large diameter. Said wheel is rotatably held upon a spindle 48 that is firmly secured in and projects downwardly from one arm **50*a* of a bell crank in the form of a plate 50. Said bell crank is pivotally supported upon a stud 52 (Figure 1) which projects downwardly from the top panel 12 of casing 10 in axial alignment with the upwardly directed output shaft 42 of motor 40. Projecting downwardly from the center of wheel 46 and integral therewith is a tubular stub shaft 54; and releasably secured to the lower end of shaft 32 for rotation therewith, such as by means of a friction clutch arrangement 55, is another wheel or disc 56 of relatively large diameter which is made of a light weight material, such as duraluminum, and whose peripheral edge is provided with a rubber tire 58. The other arm 50b of the bell crank 50 extends through the space between the shafts 24 and 32 (Figure 3) and a spring 60 tensioned between the counter-clockwise edge of said arm 50b as viewed in Figures 2 and 3 and a suitable point 62 of casing 10 urges the bell crank 50 in counter-clockwise direction and in this manner holds the rotating stub shaft 54 projecting downwardly from wheel 46 in driving engagement with the rubber lined edge 58 of the disc 56 upon the shaft 32. Thus, whenever the motor 40 operates and its output shaft 42 turns, for instance, in clockwise direction as viewed in Figures 2 and 3, the shaft 32 for the take-up reel turns in the same direction at a greatly reduced speed due to the transmission ratios established by output shaft 42 and fly wheel 46 and by stub shaft 54 and disc 56**.

Integral with the wheel 46 is a pulley 64 which is connected by an endless belt 66 with a pulley 68 of light weight material, such as duraluminum, that is releasably secured by means of a friction clutch arrangement 69 to the lower end of the shaft 24 upon which the supply reel 18 is mounted. When the bell crank 50 is in the rotary position illustrated in Figure 2, wherein the stub shaft 54 on wheel 46 bears against and is in driving engagement with the edge 58 of the wheel 56 on shaft 32 due to the urgency of spring 60, the belt between the pulleys 64 and 68 is in a slack or loose condition and the pulley 64 is therefore unable to drive the pulley 68. As a consequence thereof the shaft 24 with the supply reel 18 mounted thereon, may idle in whichever way it may be pulled by the forces acting upon the take-up reel 26.

However, when the bell crank 50 is turned in a clockwise direction on its pivot 52 against the urgency of spring 60, the center point of wheel 46 and hence of pulley 64 is moved farther away from the center point of pulley 68 and as a result thereof the belt 66 is tensioned. The described rotation of the bell crank 50 on pivot 52 is also effective to remove the rotating stud 54 upon wheel 46 from engagement with the periphery of disc 56. The periphery of wheel 46, however, remains in operative engagement with the output shaft 42 of motor 40 due to the fact that the pivot stud 52 of the bell crank 50 is coaxial with the motor shaft 42, so that rotation of the bell crank 50 upon said stud 52 will merely cause the wheel 46 to roll around the motor shaft 42 without losing operative contact therewith. Hence, the motor shaft 42 turns the fly wheel 46 in the same manner as before, but the flow of rotary power from wheel 46 through its stud 54 to the disc 56 and hence to the shaft 32 of take-up reel 24 is interrupted, and the shaft 32 with the take-up reel seated thereon may now idle. On the other hand, the pulley 64 on wheel 46 is now able, through the tensioned belt 66, to transmit its rotary power to the pulley 68 on the shaft 24 of the supply reel 18. As a result said shaft and the supply reel 18 mounted thereon will now turn in a direction opposite to the direction in which the take-up reel was turned before the bell crank 50 was turned in a clockwise direction; and since the pulley 68 on shaft 24 is of a shorter diameter than the pulley 64 on fly wheel 46, the shaft 24 will turn at a materially greater speed than the speed with which the shaft 32 of the take-up reel was turned when the bell crank 50 was in its initial counter-clockwise position of adjustment.

To effect the described rotation of the bell crank 50 which reverses the rotation of the reels, the clockwise edge of its long arm 50b may be connected to the armature 70 of a solenoid 72 through a suitable cushioning spring 74.

Figure 3:
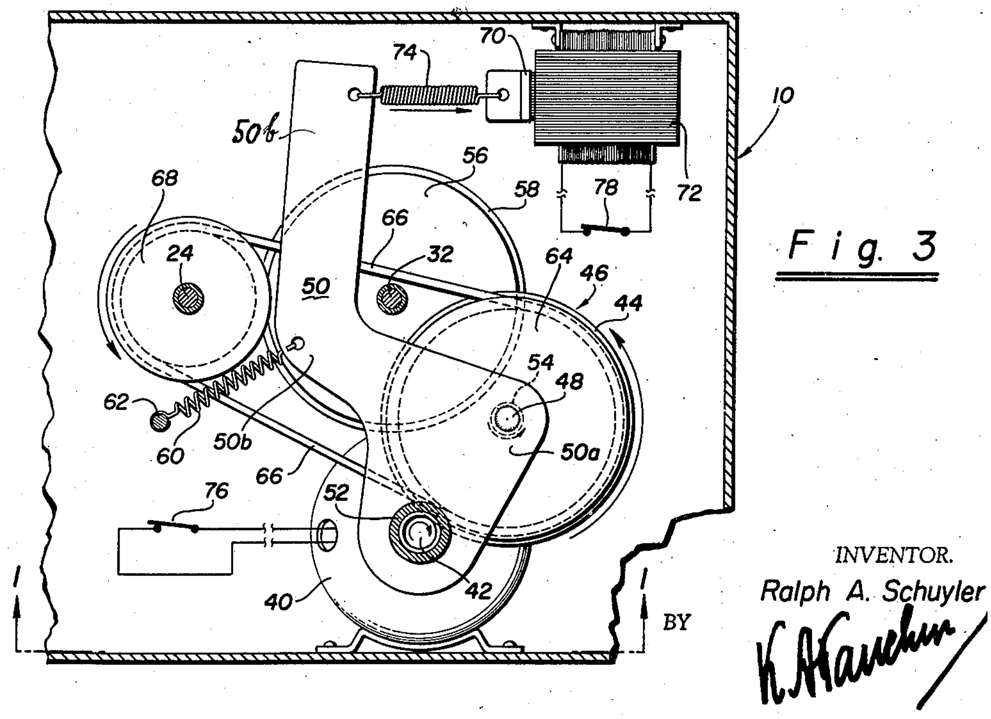
Figure 3 is a plan view of the transmission shown in Figures 1 and 2 in a different position of adjustment from that illustrated in Figure 2.
Figure 2:
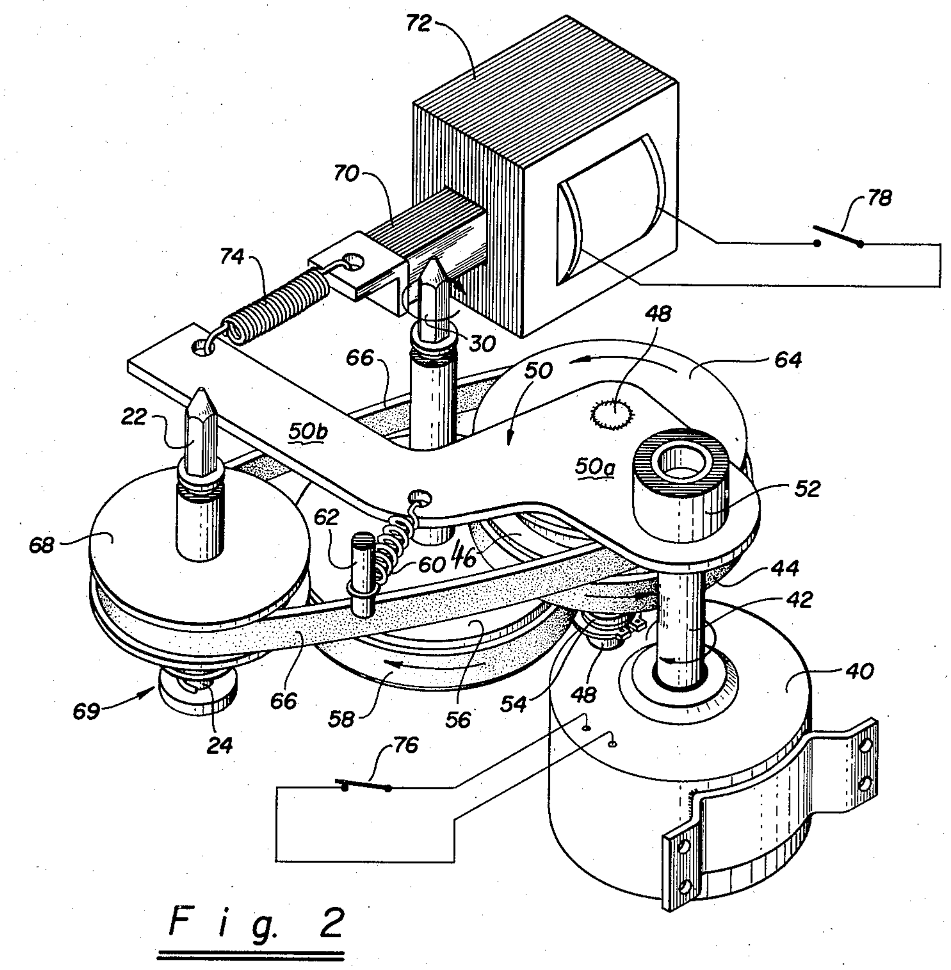
Figure 2 is a perspective of the transmission embodying my invention.

Whenever it is desired to turn the take-up reel 26 for the purpose of recording music or speech upon the tape 16, the motor 40 may be set into operation by closure of a suitable switch 76 in its power circuit, and whenever the motor operates, the shaft 32 for the take-up reel 26 is turned at a slow speed in clockwise direction, as viewed in Figures 2 and 3, and pulls the tape 16 at the proper speed past the recording head 14. Then, whenever it is desired to rewind the tape, it is merely necessary to close a control switch 78 in the power circuit of the solenoid 72, which smoothly rocks the bell crank 50 in clockwise direction from the position shown in Figure 2 into the position shown in Figure 3. This interrupts the flow of rotary power from the motor 40 to the shaft 32 for the take-up reel 26 and releases said shaft for idling. At the same time it delivers the rotary power of the motor in the opposite direction to the shaft 24 for the supply reel 18 at a greatly increased speed as compared with the rotational speed previously imparted to shaft 32.

The transmission of my invention makes it possible for the take-up and supply reels of a recording machine to be selectively driven at greatly different speeds and in opposite directions from a single uni-directional motor. The change-over in the setting of the transmission is effected by movement of a single component, namely the bell crank 50, which movement may be accomplished by energization of a simple single solenoid of small dimensions. Owing to the light weight construction of the disc 56 on the drive shaft 32 for the take-up reel 26 and of the pulley 68 on the drive shaft 24 for the supply reel 18, the rotation of whatever reel was driven at the time a change-over is made by energization or de-energization of the solenoid 72, will come to a halt in the shortest of time, and there will be a minimum of overthrow after the solenoid has been actuated. On the other hand due to the fact that the fly wheel 46, its pulley 64 and drive stud 54, which turn continuously during operation of the motor, are of heavy weight construction, they will immediately transmit their rotary power to whichever power train they are effectively coupled by energization or de-energization of the solenoid, so that either reel responds immediately to the setting of the bell crank 50 and will, within a minimum of time, commence rotation in the desired direction. Due to the presence and particular location of the spring 60 the transmission arrangement of my invention has the additional advantage that its rotary components 54 and 56 will always make effective frictional driving contact irrespective of severe wear of said components which may occur after prolonged use of the transmission.

While I have described my invention with the aid of an exemplary embodiment thereof, it will be understood that the invention is not limited to the constructional details shown and described, which may be departed from without departing from the spirit and scope of the invention.

I claim:

1. A power transmission arrangement for selectively driving either of a pair of shafts in opposite directions from a uni-directionally operating drive shaft comprising a bell crank mounted for rotation about an axis coincident with the axis of said drive shaft, a first rotary member rotatably mounted upon said bell crank with its periphery in operative contact with said drive shaft, a second rotary member mounted upon one of said driven shafts for rotation therewith, a third rotary member mounted upon the other one of said driven shafts for rotation therewith, means including an endless power transmission member for transmitting rotary power from said first to said third rotary member, spring means yieldably urging said bell crank into a position wherein said first rotary member is in driving contact with said second rotary member, and said first and third rotary members are sufficiently approached to render said endless transmission member ineffective, and means operable to turn said bell crank against the urgency of said spring means into a position wherein said first rotary member is withdrawn from said second rotary member, and said first and third rotary members are sufficiently removed from each other to render said endless transmission means effective.

2. A power transmission arrangement for selectively driving either of a pair of shafts in opposite directions from a uni-directionally operating drive shaft comprising a bell crank mounted for rotation about an axis coincident with the axis of said drive shaft, a first rotary member rotatably mounted upon one arm of said bell crank with its periphery in operative contact with said drive shaft, a second rotary member mounted upon one of said driven shafts for rotation therewith, a third rotary member mounted upon the other one of said driven shafts for rotation therewith, means including an endless power transmission member for transmitting rotary power from said first rotary member to said third rotary member, spring means yieldably urging said bell crank into a position wherein said first rotary member is in driving contact with said second rotary member and said first and third rotary member are sufficiently approached to render said endless transmission member ineffective, and means engaging the other arm of said bell crank and operable to turn said bell crank against the urgency of said spring means into a position wherein said first rotary member is withdrawn from said second rotary member and said first and third rotary members are sufficiently removed from each other to render said endless transmission member effective.

3. A power transmission arrangement for selectively driving either of two shafts in opposite directions from a uni-directionally operating drive shaft comprising a bell crank mounted for rotation about an axis coincident with said drive shaft, a wheel rotatably supported from one arm of said bell crank with its periphery in operative engagement with said drive shaft, a stub shaft coaxial and integral with said wheel, a pulley coaxial and integral with said wheel, a disc mounted upon one of said driven shafts for rotation therewith, another pulley mounted upon the other one of said driven shafts for rotation therewith, an endless belt trained about said pulleys, spring means urging said bell crank into a position wherein said stud is in driving engagement with said disc and said pulleys are sufficiently approached to each other to render said belt slack, and means acting upon the other arm of said bell crank and operable to turn said bell crank against the urgency of said spring means into a position wherein said stud is withdrawn from said disc and said pulleys are sufficiently removed from each other to tension said belt.

4. A power transmission arrangement for selectively driving a first and second shaft at different angular speeds and in the opposite direction comprising a plate mounted for rotation about an axis coincident with the axis of said drive shaft, a wheel of relatively large diameter rotatably supported from said plate with its edge in operative engagement with said drive shaft, a stub shaft projecting from one side of said wheel coaxially therewith, a pulley arranged coaxially upon the other side of said wheel and integral therewith, a disc of relatively large diameter mounted upon said first shaft for rotation therewith, a pulley of a smaller diameter than said first mentioned pulley mounted for rotation upon said second shaft, an endless belt trained about said pulleys, spring means urging said plate into a position wherein said stud is in driving engagement with the edge of said disc and said pulleys are sufficiently approached to each other to render said endless belt slack, and means operable to turn said plate against the urgency of said spring means into a position wherein said stud is withdrawn from the edge of said disc and said pulleys are sufficiently removed from each other to tension said belt.

5. Arrangement according to claim 4 wherein said last mentioned means is a solenoid, and including a spring connected between said plate and the armature of said solenoid.

6. A power transmission arrangement for selectively driving a first and second shaft at different angular speeds and in the opposite directions comprising a plate mounted for rotation about an axis coincident with the axis of said drive shaft, a wheel of heavy weight material and relatively large diameter rotatably supported from said plate with its edge in operative engagement with said drive shaft, a stub shaft projecting from one side of said wheel coaxially therewith, a pulley arranged coaxially upon the other side of said wheel and integral therewith, a disc of light weight material and relatively large diameter mounted upon said first shaft for rotation therewith, a pulley of light weight material and of a smaller diameter than said first mentioned pulley mounted for rotation upon said second shaft, an endless belt trained about said pulleys, spring means urging said plate into a position wherein said stud is in driving engagement with the edge of said disc and said pulleys are sufficiently approached to each other to render said endless belt slack, and means operable to turn said plate against the urgency of said spring means into a position wherein said stud is withdrawn from the edge of said disc and said pulleys are sufficiently removed from each other to tension said belt and render it effective to transmit rotary power from the first mentioned to the last mentioned of said pulleys.

References Cited in the file of this patent

UNITED STATES PATENTS

| | | |
|---|---|---|
| 1,601,530 | Ireland et al. | Sept. 28, 1926 |
| 2,528,061 | Knapp | Oct. 31, 1950 |
| 2,555,643 | Harrison | June 5, 1951 |